United States Patent Office 2,959,618
Patented Nov. 8, 1960

2,959,618 m- AND p-XYLYLENE-DI-(DIALKANOLAMINES)

Lucas Petrou Kyrides, Ekali, Greece, assignor to Wyandotte Chemicals Corporation, Wyandotte, Mich., a corporation of Michigan No Drawing. Filed June 9, 1958, Ser. No. 740,524

6 Claims. (Cl. 260—570.9)

The invention relates to m- and p-xylylene-di-(dialkanolamines) and to a process for obtaining these compositions.

An object of this invention is to provide the art with a new class of compounds from xylylene dichloride.

Another object of this invention is to provide the art with a new class of compounds prepared from m- and p-xylylene dichloride, which compounds comprise tertiary nitrogen as well as a plurality of terminal hydroxyl groups.

In summary, this invention comprises a class of compositions which are generically identified as xylylene-di-(dialkanolamines) selected from the group consisting of m-xylylene-di(dialkanolamines), p-xylylene-di-(dialkanolamines) and mixtures thereof.

Representative of compositions within the class are p-xylylene-di-(diethanolamine), p-xylylene-di-(diisopropanolamine), p-xylylene-di-(dibutanolamine), m-xylylene-di-(diethanolamine), m-xylene-di-(diisopropanolamine), and m-xylylene-di(dibutanolamine).

To prepare a composition of this invention a dialkanolamine, such as diethanolamine, diisopropanolamine, and dibutanolamine is added to xylylene dichloride, present either as the pure m- or p-isomer or in admixture and preferably in the presence of an acid binding agent, such as, for example, sodium carbonate or sodium bicarbonate. The mol ratio of the dialkanolamine to the xylylene dichloride should be at least 2:1 and preferably greater in order to obtain the maximum conversion of the xylylene dichloride to the desired end product. While, under the concepts of this invention, any dialkanolamine can be used, the dialkanolamines currently available commercially are those just itemized. Consequently, as a practical matter, the compositions of this invention are limited to m- and p-xylylene-di-(dialkanolamines) wherein the dialkanolamine radical is selected from the group consisting of the above mentioned dialkanolamines.

Because of the presence of two nitrogen atoms and four hydroxyl groups, the xylylene-di-(dialkanolamines) of this invention can be used for a large number of typical reactions to produce valuable industrial compounds and in this regard it is noteworthy that the lower members of the class of compositions of this invention are extremely soluble in water. In particular, the compositions of this invention can be used as intermediates for the production of germicides, dispersing agents, detergents, etc.

The xylylene-di-(dialkanolamines) are also useful as catalysts and as cross-linking agents in the preparation of polyurethane polymers in the form of rigid foams for use as insulation and the like.

To illustrate the various features and advantages of this invention, the following examples are presented.

The following example illustrates the preparation of p-xylylene-di-(diethanolamine).

Example 1

A 3-necked liter flask fitted with a thermometer, stirrer, and reflux column was charged with 97 grams (0.92 mol) of freshly distilled diethanolamine, 200 cc. of butanol and 80 grams (0.46 mol) of p-xylylene chloride. The mixture was agitated while heating to 60° C. An initial reaction occurred for a short period of time during which the mixture was cooled. Thereafter finely divided sodium carbonate was added in small portions, giving rise to gas evolution. As the gas ($CO_2$) evolution ceased, fresh sodium carbonate was added until further addition did not result in the generation of carbon dioxide. Some more sodium carbonate was then added and the temperature was raised to 98° C. to make sure that the reaction was at an end. Fifty cc. of n-butanol were then added and by raising the temperature, butanol and water were distilled off to effect dehydration of the reaction mixture. The batch was then cooled, filtered and the filter cake (salt and excess sodium carbonate) washed with fresh butanol to remove residual product. The filtrate and wash liquor were then concentrated and gradually heated under vacuum to remove residual butanol. Finally, the filtrate was held a short time at 180° C. at 2 mm. mercury pressure. At this temperature it was noted that discoloration sets in. (At higher temperatures, especially in contact with air, decomposition sets in.)

The liquid thus obtained, slightly dark, solidified in time to give a grayish solid. After remelting and cooling the solid material, it turned into glassy form which stayed that way for several days, whereupon slow crystallization began. Some time later the product was observed to be a tan-colored waxy solid.

A nitrogen analysis of the product showed a tertiary nitrogen content of 8.9% by weight. The theoretical value is 8.97% by weight. The hydroxyl number as determined by the method of Ogg et al., Ind. Eng. and Chem,. Anal. Ed. 17, 395 (1945), was found to be 708. The theoretical value is 718. The molecular weight was found to be 316 whereas the theoretical value is 312. Finally, the melting point of the composition was 63°–65° C. The product also analyzed about 0.25% by weight of chlorine which most probably represents the presence of sodium chloride which was the amount in solution before distilling off the n-butanol.

In the same manner the other xylylene-di-(dialkanolamines) of the invention can be prepared.

The following example illustrates the utility of the xylylene-di-(dialkanolamines) of this invention as cross-linking agents, and mild accelerators for, the formation of polyurethane foams.

Example 2

100 parts by weight of Tetronic polyether polyol 904 (N,N,N',N', tetrakis(hydroxy-polyoxyethylene - polyoxypropylene) ethylenediamine), wherein the average molecular weight of the polyoxypropylene-ethylenediamine base is in the range of 3601 to 4500 and the oxyethylene content is in the range of 40–49% by weight of the total molecule, which is a liquid at room temperature, was mixed with 35 parts by weight of p-xylylene-di-(diethanolamine) with warming to dissolve the compound in the polyether polyol. The solution was then mixed together with 2.5 parts by weight of water and 0.6 part by weight of silicone oil (50 centistokes). After the mixture was stirred until well blended, 75 parts by weight of toluene diisocyanate (80/20, 2,4/2,6 isomer mixture) were then added and the resulting mixture stirred until creamy. At this point the mixture was poured quickly into a mold which in this case was a paper cup and a solid foam began to form. In about one minute the foam reached its full height and was tack free almost instantaneously.

Simultaneously with the above, there was prepared with the same procedure a foam involving the same ingredients and concentrations except, in place of p-xylylene-di-(diethanolamine), there was used 35 parts by weight of Quadrol polyol (N,N,N',N', tetrakis(2-hydroxypropyl)ethylenediamine) which has a molecular weight of about 292 and which is a known cross-linking agent and accelerator.

It was found that the foam containing p-xylylene-di-(diethanolamine) raised more rapidly, scorched slightly more, had a higher density, was less rigid, was less friable and was tougher than the foam containing the Quadrol polyol and had a uniform, small-celled structure.

What is claimed is:

1. Xylylene-di-(dialkanolamines) selected from the group consisting of m-xylylene-di(dialkanolamines) and p-xylylene-di-(dialkanolamines) wherein each alkanol group contains from 2 to 4 carbon atoms.
2. p-Xylylene-di-(diethanolamine).
3. p-Xylylene di-(diisopropanolamine).
4. m-Xylylene di-(diethanolamine).
5. m-Xylylene di-(diisopropanolamine).
6. p-Xylylene di-(dibutanolamine).

References Cited in the file of this patent

UNITED STATES PATENTS

| | | |
|---|---|---|
| 2,604,399 | Donovan et al. | July 22, 1952 |
| 2,683,744 | Kerwin et al. | July 13, 1954 |
| 2,723,996 | Strobel et al. | Nov. 15, 1955 |
| 2,790,830 | Bader | Apr. 30, 1957 |